March 6, 1951  S. J. KILLINGSWORTH  2,543,854
WHEEL RETAINER FOR VEHICLES
Filed April 23, 1948

Samuel J. Killingsworth
INVENTOR.

Patented Mar. 6, 1951

2,543,854

UNITED STATES PATENT OFFICE 2,543,854

WHEEL RETAINER FOR VEHICLES

Samuel J. Killingsworth, Brewton, Ala., assignor of 35% to William H. Horton, 6.5% to B. J. Killingsworth, 6.5% to Kate Koon, 6.5% to Annie Ruth Ogletree, all of Brewton, Ala., and 6.5% to S. W. Killingsworth, Flomaton, Ala.

Application April 23, 1948, Serial No. 22,837

3 Claims. (Cl. 301—114)

This invention relates to new and useful improvements in spindle and wheel constructions and the primary object of the present invention is to provide novel and improved means carried by a spindle for preventing the lock nut mounted on the outer threaded end of the spindle from stripping the threads of said outer end during the movement of a vehicle over a rough terrain or road surfaces.

Another important object of the present invention is to provide a wheel retainer for vehicles that will prevent the outward movement of a rotatable hub mounted on a spindle.

A further object of the present invention is to provide a spindle construction including novel and improved means that are quickly and readily applied to a spindle adjacent a rotatable hub, for retaining the hub in a correct and safe position on the spindle.

A still further aim of the present invention is to provide a wheel retainer for vehicles that is simple and practical in construction, strong and reliable in use, small and compact in structure, relatively inexpensive to manufacture, and otherwise well adapted for the purposes for which the same is intended.

Figure 1:
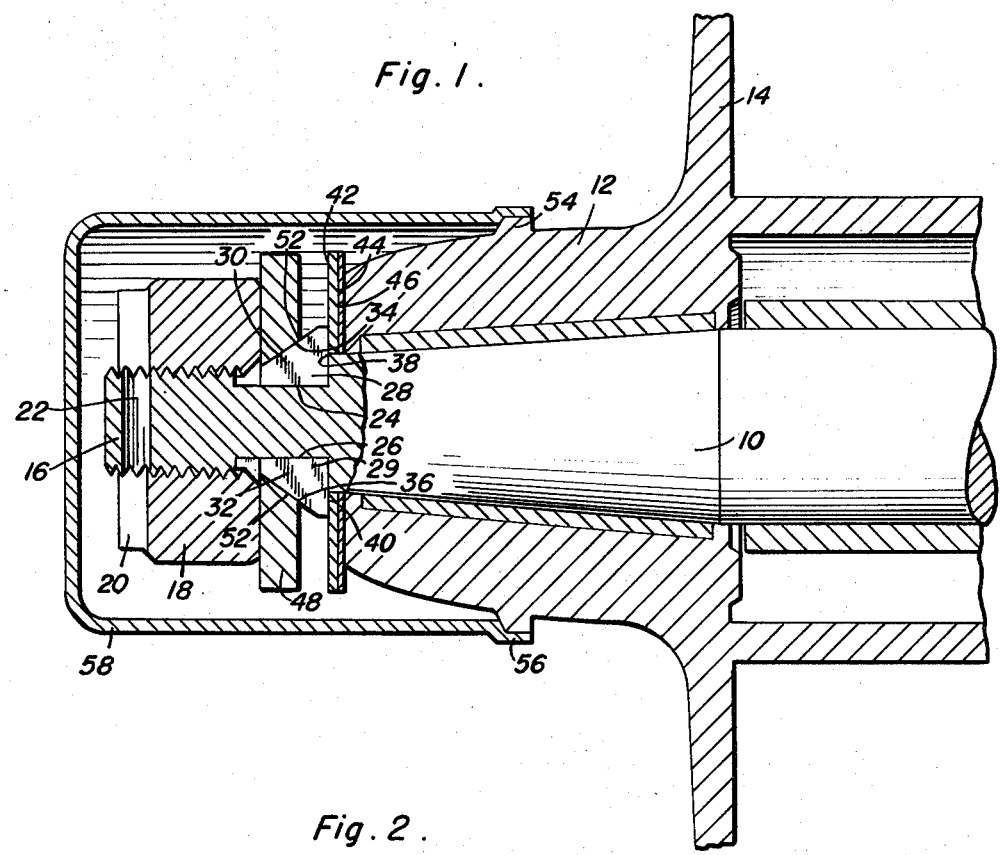
Figure 2:
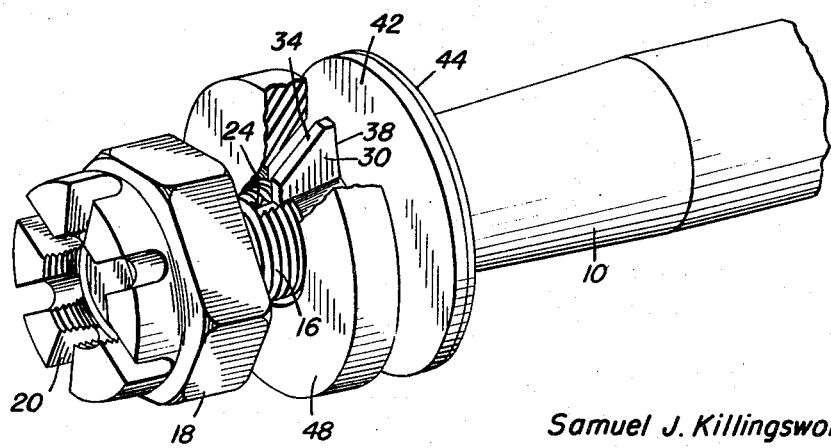

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary longitudinal vertical sectional view taken through one end of a wheel and spindle construction, and showing the present invention applied thereto; and, Figure 2 is a fragmentary perspective view of a wheel and spindle construction, showing the present invention applied thereto, and with parts broken away and shown in section.

Referring now to the drawings in detail, wherein for the purpose of illustration, there is disclosed a preferred embodiment of the present invention, the numeral 10 represents a spindle such as the front spindle of a passenger vehicle, truck or the like, on which there is rotatably mounted the hub portion 12 of a wheel 14. As is usual for such spindle constructions, the outer end 16 of the spindle is externally threaded and receivably engages a lock nut 18 having a plurality of opposed pairs of radial recesses 20, one pair of which is adapted to align a bore or aperture 22 provided in the reduced outer end 16, for engaging a cotter pin or the like (not shown), whereby the hub will be locked on the spindle against outward movement.

During the movement of the vehicle wheel 14 over rough terrain, frequently the hub portion 12 will move outwardly on the spindle, causing the said hub portion 12 to frictionally engage the lock nut and exert a pressure or force on the lock nut. Such an occurrence will effect a shearing or stripping of the threads on the outer end 16 of the spindle, and also will tend to cause the wheel 14 to become "out of line."

To prevent such a harmful wear or thread stripping action on the outer end of the spindle, there is provided a pair of longitudinal slots 24 and 26 in the diametrically opposite sides of the outer end 16, that receive the inner longitudinal edges 28 and 29 of a pair of outwardly projecting lugs or wedge shaped plates 30 and 32 having inclined bearing edges 34 and 36 and transverse bearing edges 38 and 40. The transverse bearing edges 38 and 40 abut the outer washer of a pair of wear washers 42 and 44 that are loosely mounted on the spindle 10. The washer 44 bears against the outermost end 46 of the hub portion 12. In order to retain the wedge shaped plates 30 and 32 in place, there is provided a bearing ring or washer 48 having diametrically opposed inclined notches or slots 50 and 52 that receive a portion of the inclined bearing edges 34 and 36, as shown best in Figure 1 of the drawings. The outer face of the washer 48 bears against the inner face of the lock nut 18.

An annular flange 54 is provided about the hub portion 14, and engages the enlarged open end 56 of a closure cap 58 that loosely embraces the outer end 16 of the spindle and the elements supported thereon.

In practical use of the device, the outward movement of the hub 12 will exert a pressure upon the washers 42 and 44, which in turn will impart an axial movement or force to the wedge plates 30 and 32 and the wedge plates will exert a radial force upon the washer 48. Said wedge plates 30 and 32 being embedded in spindle 10 take care of all bumping and kicking of hub 12 thereby eliminating all thread stripping pressure on spindle nut 18.

It should be noted that the washer 48 will rigidly hold the wedge plates (or keys) in key seats in the spindle.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A spindle having a screw threaded outer end, a hub rotatable on said spindle, a lock nut receivably engaging the outer end of said spindle, means interposed between said hub and said lock nut embracing the outer end of said spindle and abutting said lock nut, and members slidably carried by the outer end of said spindle for exerting a radial force on said first mentioned means upon outward movement of said hub on said spindle, the outer end of said spindle having recesses receiving said members.

2. The combination of claim 1 wherein said members include a plurality of wedge plates having their inclined faces frictionally engaging said first mentioned means.

3. A spindle having a screw threaded outer end, a hub rotatable on said spindle, a lock nut receivably engaging the outer end of said spindle, a washer interposed between said hub and said lock nut and embracing the outer end of said spindle, said washer bearing against said lock nut, and means slidably carried by the outer end of said spindle responsive to the outward movement of said hub on said spindle for exerting a radial force on said washer, said means including a pair of diametrically opposed wedge plates, and recesses in the outer end of said spindle receiving said wedge plates.

SAMUEL J. KILLINGSWORTH.

REFERENCES CITED

The following references are of record in the file of this patent:

UNITED STATES PATENTS

| Number | Name | Date |
| --- | --- | --- |
| 273,458 | Burris | Mar. 6, 1883 |
| 493,474 | Bressler | Mar. 14, 1893 |
| 873,386 | Roe | Dec. 10, 1907 |

FOREIGN PATENTS

| Number | Country | Date |
| --- | --- | --- |
| 79 | Great Britain | 1882 |